A. H. KENNEDY.
Apparatus for Transmitting Motion.
No. 5,476. Reissued July 1, 1873.
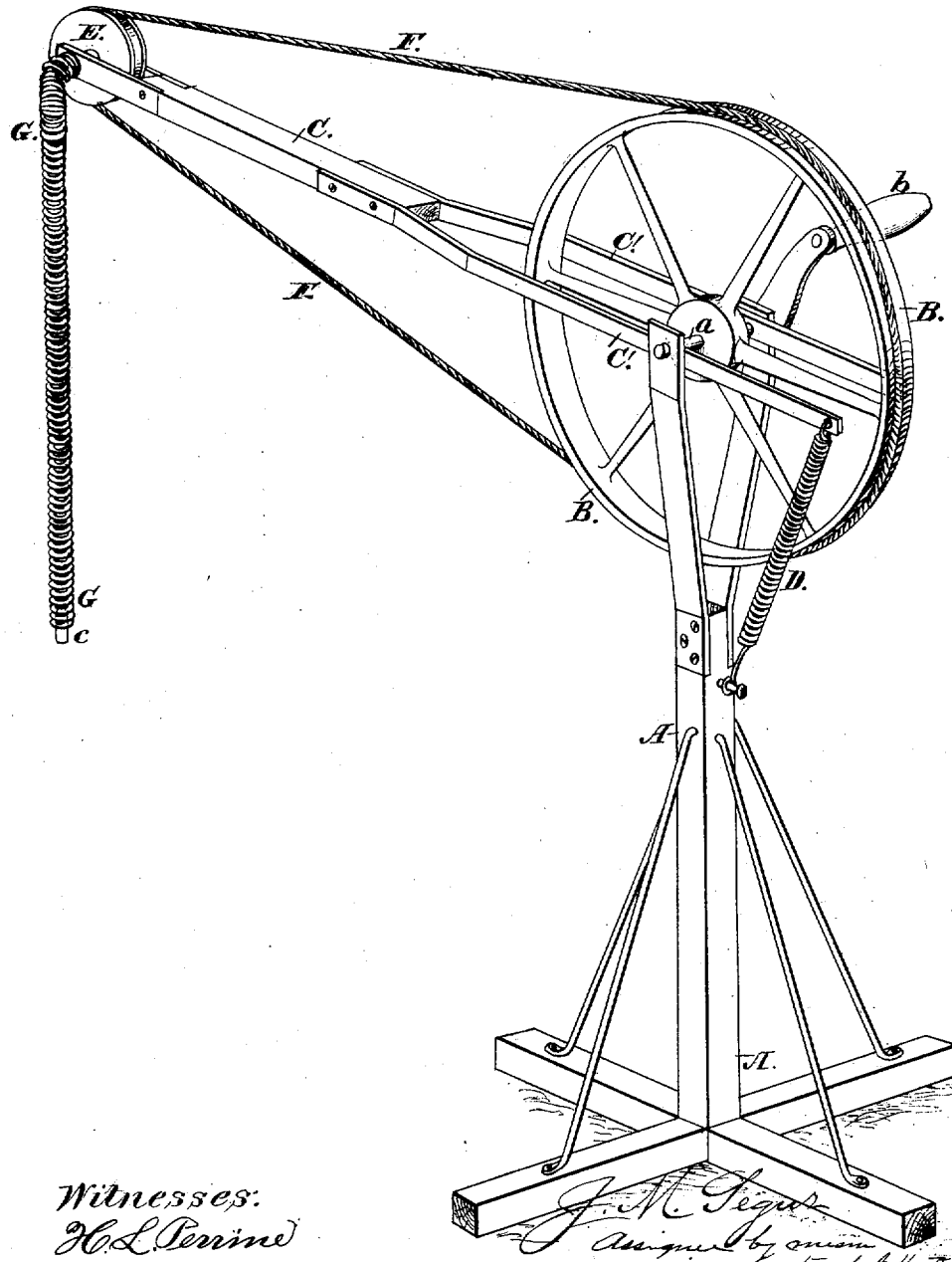
Witnesses:
H. L. Perine
Harry Coleman.
J. N. Seguin
Assignee by mesne assignments of A. H. Kennedy
Per Jones & Co.
Attorneys.
THE NORRIS PETERS CO., PHOTO-LITHO., WASHINGTON, D. C.

UNITED STATES PATENT OFFICE.

ALBERT H. KENNEDY, OF BRUNSWICK, ASSIGNOR, BY MESNE ASSIGNMENTS, TO J. M. SEGUR, OF AKRON, OHIO.

IMPROVEMENT IN APPARATUS FOR TRANSMITTING MOTION.

Specification forming part of Letters Patent No. 52,293, dated January 30, 1866; reissue No. 2,615, dated May 14, 1867; reissue No. 5,476, dated July 1, 1873; application filed June 13, 1873.

*To all whom it may concern:*

Be it known that ALBERT H. KENNEDY, of Brunswick, in the county of Medina and State of Ohio, assignor, by mesne assignments, to JOSEPH M. SEGUR, of Akron, in the county of of Summit in the same State, invented certain new and useful Improvements in Machines and Devices for Transmitting Power, of which the following is a specification:

The invention consists, first, in a flexible shaft for transmitting power or motion, composed of a spirally-coiled wire, and operating in a rotating or torsional movement; second, in the embodiment of such a shaft in a machine for operating mechanical instruments directed by hand, particularly adapted for use in shearing sheep, and for other purposes where a free movement of the tool or instrument is desired in a manner not to interfere with its operation or effective motion.

The drawing shows the invention in perspective.

A represents a stand or frame, upon which, in suitable supports, is hung a shaft, *a*, which shaft may be driven by a crank, *b*, or in any other equally well-known way. This shaft *a* carries a pulley or belt wheel, B, from which power is taken to drive the cutting instrument. Upon the shaft *a* is hung an extended arm, C, by means of the spanned or forked arms C′ C′, which arms are part and parcel of said extended arm, being forked or divided to afford a wider and better bearing on said shaft, and so as to embrace, between said arms, the belt or pulley wheel. One or both of the arms C′ extends beyond or rearward of the shaft *a*, to which they are hinged, and is connected to a spring, D, which is also attached to the main frame or stand A, and serves to balance or hold in position the extended arm, while, at the same time, it allows it to turn on the shaft *a*, and accommodate itself to the necessities of the operator. In bearings in the forward end of the extended and balanced arm there is a pulley, E, around which, and around the pulley B or the main driving-shaft, passes an endless belt, band, or cord, F, which gives motion to the pulley E. One end of a coiled-wire shaft, G, is connected to the shaft or journal of the pulley E. To the other end of the shaft G is attached a stub, *c*, through which motion may be imparted to the instrument or tool.

Motion being given to the machine by means of a crank or its equivalent, it is communicated from the pulley B, by means of the belt or cord F, to the pulley E, and, through the coiled-wire shaft G, to the instrument in use attached to the end of the latter.

The very great flexibility of the coiled-wire shaft G permits said instrument, in the hands of the user, to be moved and turned in any direction while in working motion, even to turning upside down.

The shaft G may also have one or more full turns, or a half-knot put in it without impairing its driving action, so that it may be shortened at pleasure, if too long, or in the way, or made to extend to any reasonable distance.

The forward end of the hinged and balanced extended arm C may be drawn down by the shaft G without impeding in the least the motion of the latter; and when the said shaft G tends to become slack by raising the tool the arm will rise up again by force of the balancing or controlling device on the other side of the hinged support.

What is claimed as the invention is—

1. In a machine or apparatus for transmitting power for operating mechanical implements directed by hand, a flexible shaft, composed of a spirally-coiled wire, operating in a rotating or torsional movement, and having one end attached to the operating mechanism, while the other end is free to move in any direction at the will of the operator, substantially as set forth.

2. In a machine for transmitting power for operating mechanical implements directed by hand, the combination of the stand A, hinged extended arm C C′, pulleys B and E with belt or cord, and spring D, substantially as described.

3. The combination of the coiled-wire shaft G, pulleys B and E with belt and cord, and arm C.

4. The machine herein described, consisting of an upright stand with vertical arms supporting a shaft operated by a crank or its equivalent, and embracing a driving-wheel or pulley for imparting motion to a smaller pulley, in combination with an arm hinged to the said shaft, and extending in opposite directions therefrom, and having said smaller pulley carried on its longer end, which pulley communicates with a coiled-wire flexible shaft, and also having a spring connected to its shorter end for holding it in position, substantially as described.

J. M. SEGUR,
*Assignee, by mesne assignments, of Albert H. Kennedy.*

Witnesses:
H. C. SANFORD,
S. EDGERTON.